Patented Oct. 23, 1923.

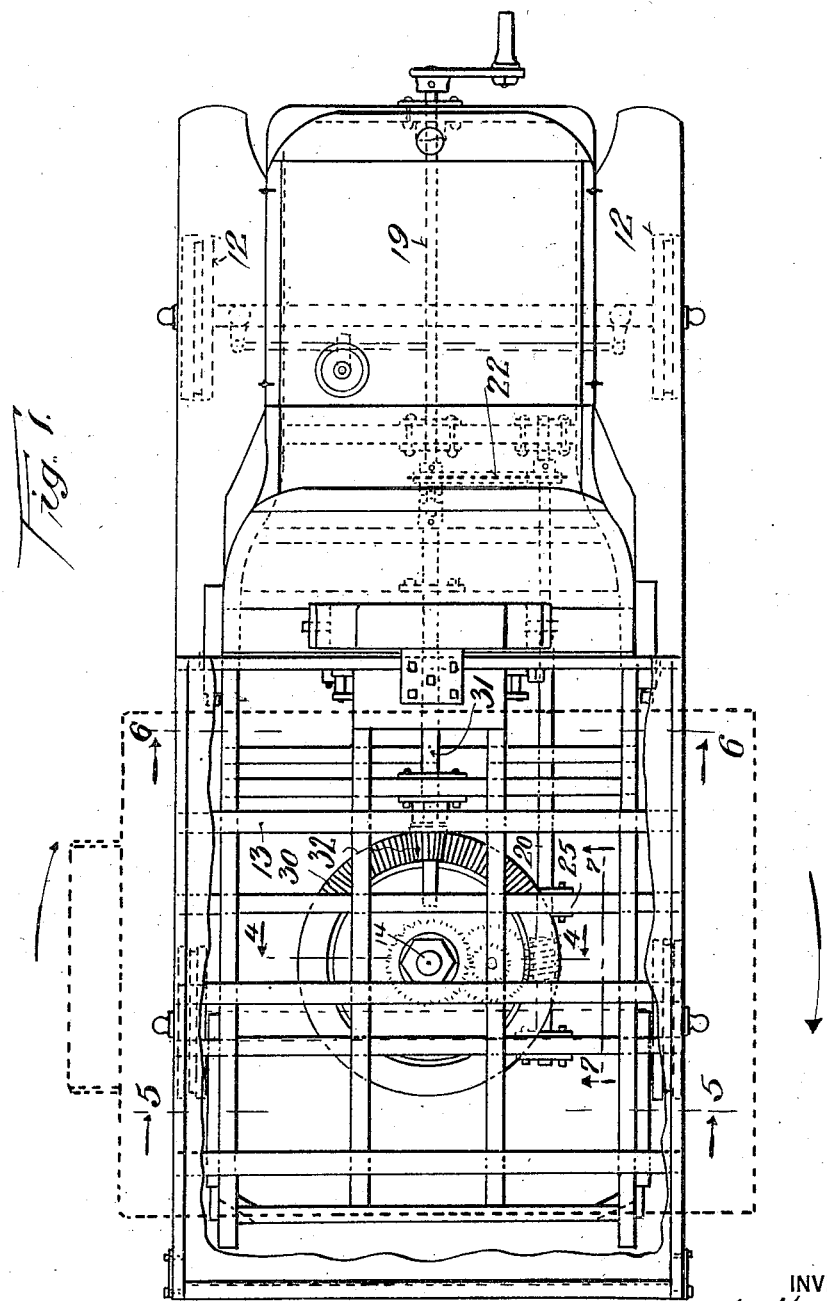

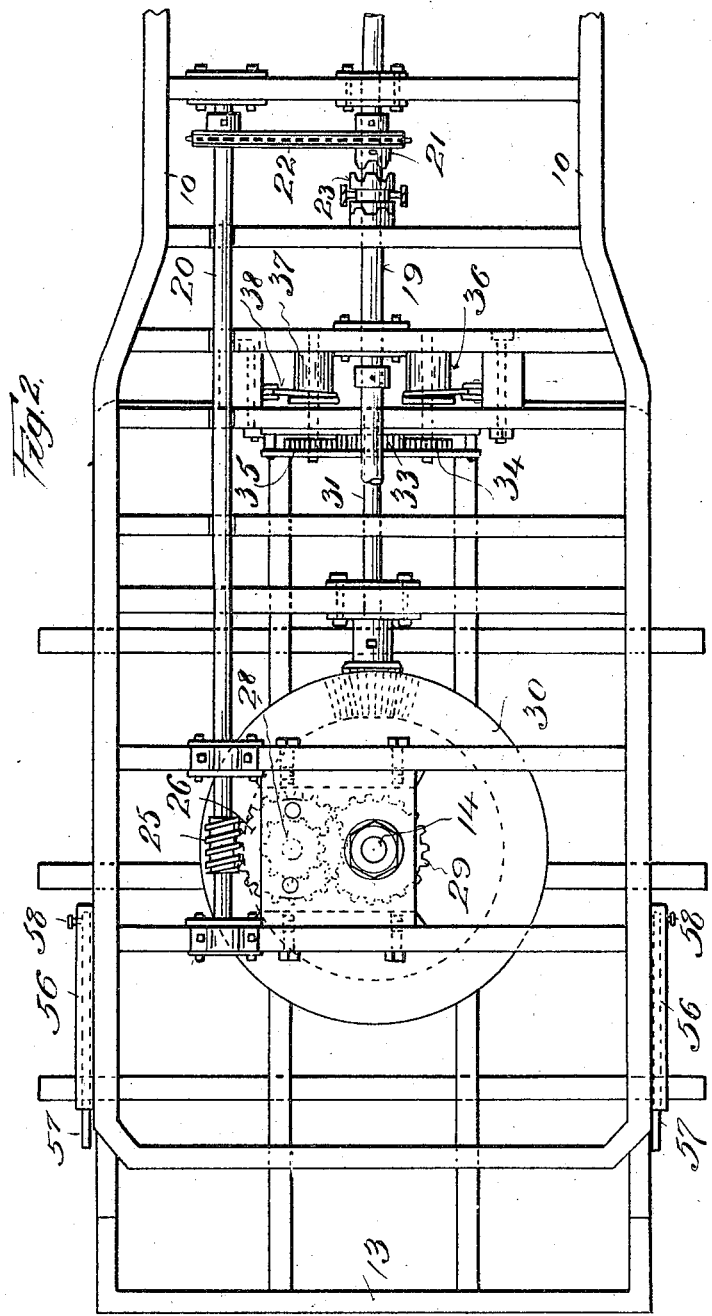

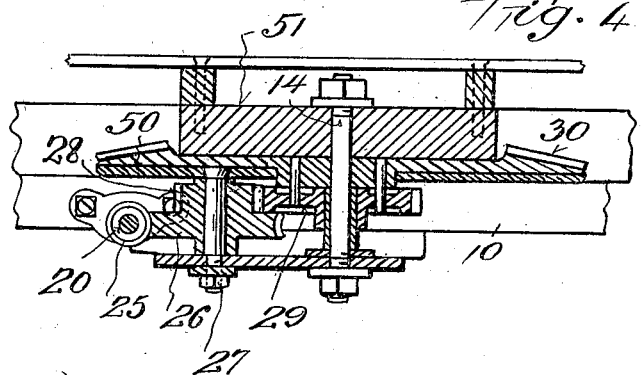
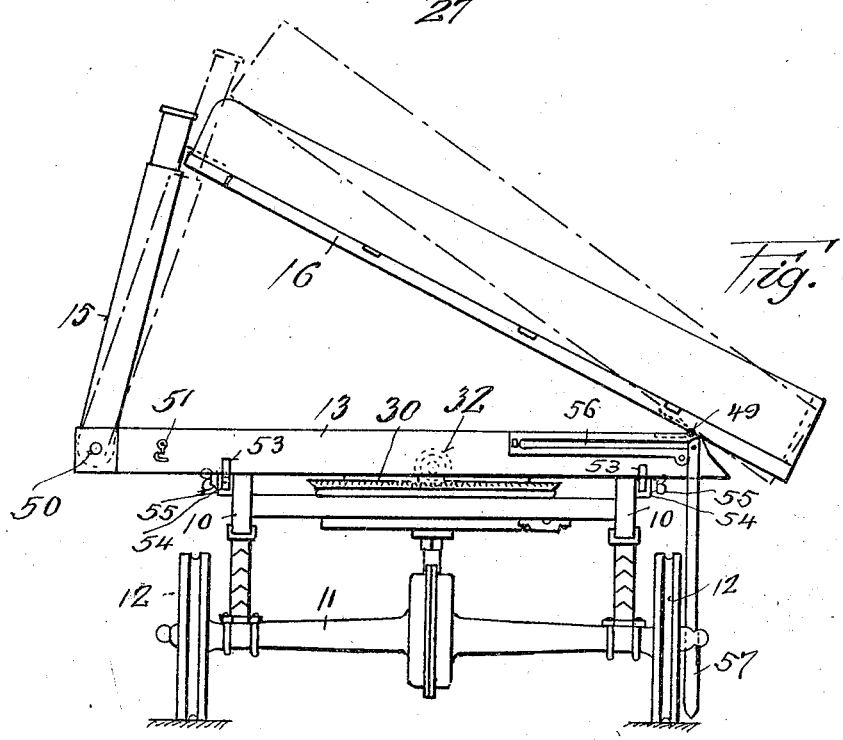

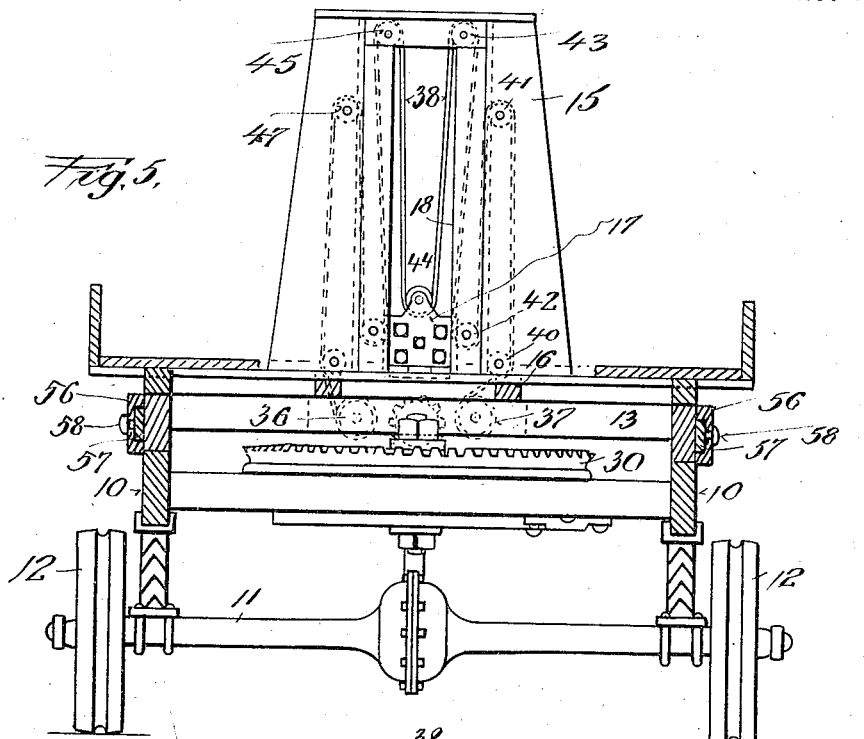

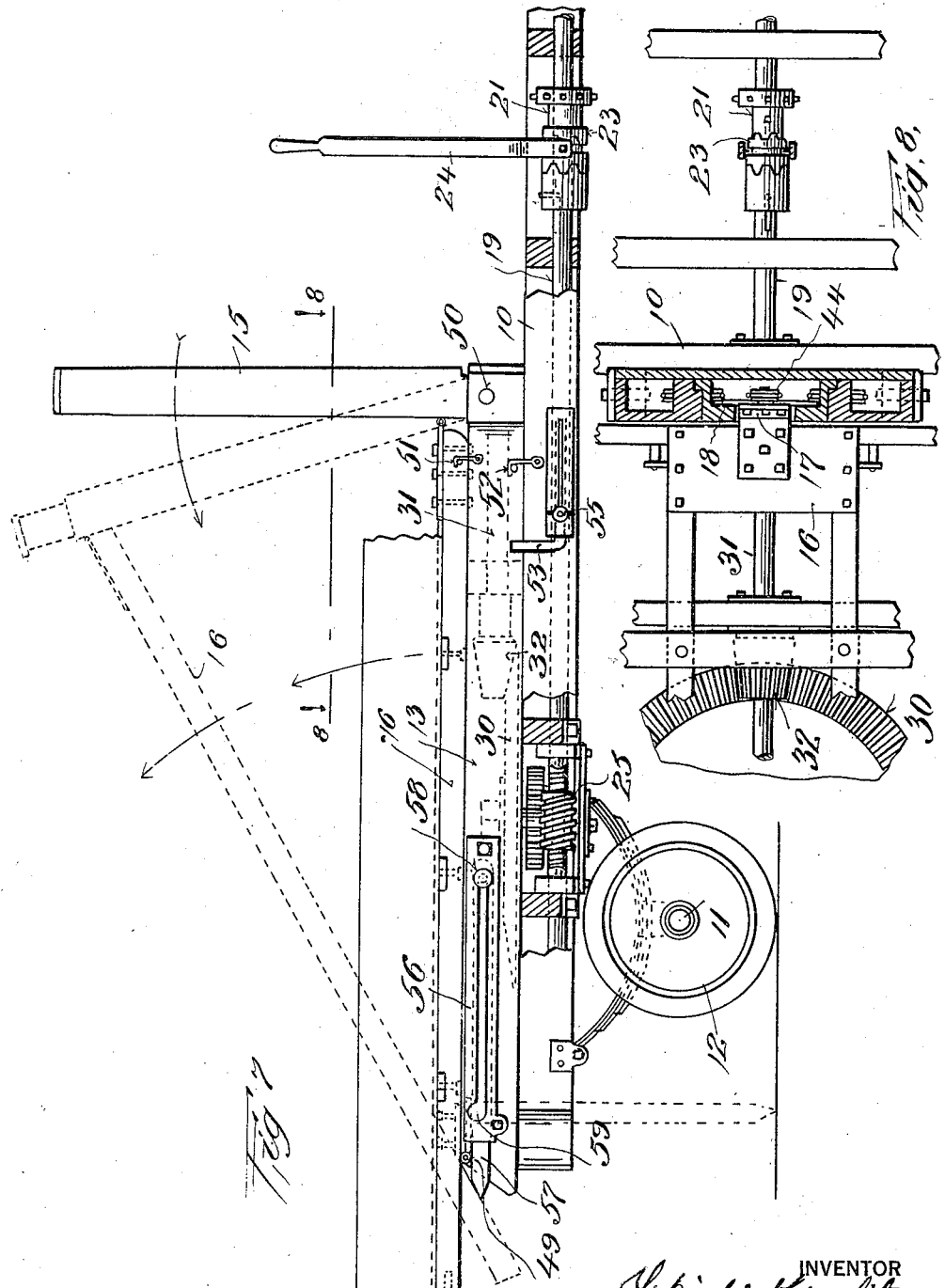

1,471,339

UNITED STATES PATENT OFFICE.

YOKICHI KINOSHITA, OF BOSTON, MASSACHUSETTS.

DUMPING-TRUCK APPARATUS.

Application filed June 4, 1921. Serial No. 474,923.

*To all whom it may concern:*

Be it known that I, YOKICHI KINOSHITA, a subject of the Emperor of Japan, residing at Boston, county of Suffolk, State of Massachusetts, have made a certain new and useful Invention in Dumping-Truck Apparatus, of which the following is a specification.

This invention relates to dumping truck apparatus.

The object of the invention is to provide a truck body or truck body support and operating apparatus therefor which is simple in structure and efficient in operation whereby the truck body may be rocked or swung into any desired angular relation with respect to the chassis and then tilted so as to dump the contents of the body.

A further object of the invention is to provide means to prevent lateral tipping of the truck body or its support.

Other objects of the invention will appear more fully hereinafter.

The invention consists substantially in the construction, combination, location, and relative arrangement of parts, all as will be more fully hereinafter set forth, as shown in the accompanying drawings, and finally pointed out in the appended claims.

Referring to the accompanying drawings:—

Fig. 1 is a view in top plan of a truck showing the application thereto of a body support and operating mechanism therefor embodying the principles of my invention.

Fig. 2 is a bottom plan view of the same.

Fig. 3 is a view in rear elevation, the truck body support being shown in laterally displaced and vertically tilted position.

Fig. 4 is a broken detail view on the line 4, 4, Fig. 1, looking in the direction of the arrows.

Fig. 5 is a view in vertical transverse section on the line 5, 5, Fig. 1, looking in the direction of the arrows.

Fig. 6 is a similar view on the line 6, 6, Fig. 1, looking in the direction of the arrows.

Fig. 7 is a view in side elevation, parts broken out, and parts in section, on the line 7, 7, Fig. 1, looking in the direction of the arrows.

Fig. 8 is a broken detail view in transverse horizontal section on the line 8, 8, Fig. 7, looking in the direction of the arrows.

The same part is designated by the same reference numerals wherever it occurs throughout the several views.

It is among the special purposes of my present invention to provide a dumping truck structure which is simple and efficient, whereby the truck body or its support may be rocked or swung into any desired angular relation with respect to its supporting chassis frame, and when swung into the desired position of angularity with respect to said frame, may be tilted so as to dump or deliver the contents of the body, and thereafter again lowered and returned to its initial position. Ordinarily a truck body is positioned upon the chassis frame of the truck in longitudinal alignment or relation with respect to the chassis, and it is a common practice to so mount such a body as to permit the same to be rocked or tilted vertically to effect a dumping of the contents of the body. In such types of truck bodies, however, the dumping of the contents of the body can be effected only from the rear end of the chassis frame. This, however, very materially limits the utility and application of dumping truck bodies. Occasions and situations frequently occur where it is desirable to dump the contents of a body at an angle to the line of the chassis frame so as to deliver such contents to a more convenient point on a loading platform, sidewalk, or other point of deposit. In carrying out my invention I provide a chassis frame 10, which may be of any suitable or convenient construction, and constituting the fixed supporting part of a truck or trailer, or the like, being supported upon the usual axles 11 and wheels 12. Mounted upon the chassis frame is what I will term a turntable 13. This turntable is mounted to swivel or turn about a vertical axis afforded by a stud shaft 14 suitably journaled in the chassis frame. Pivotally mounted at one end of the turntable is a vertically extending guide frame 15. Also pivotally mounted upon the turntable, but at the opposite end thereof, is a tilting platform 16. At its front end the tilting platform 16 is hingedly connected to a slide block 17 mounted to slide vertically in a guideway indicated at 18, see Figs. 5, 6 and 8, in the vertically extending guide member 15.

Suitably mounted in the chassis frame is a shaft 19, which, if desired, may be the power driven shaft of the truck. The turntable 13 is suitably geared to the power driven shaft 19 so as to be capable of being rocked or swung from said shaft. Many different structures or arrangements of drive gearing for this purpose may be employed. A simple arrangement is shown, to which, however, my invention is not to be limited or restricted, wherein a countershaft 20 is driven from a sleeve 21 on the power shaft 19 through sprocket chain 22. The sprocket chain may be coupled in any convenient way to rotate with the power shaft 19, as, for instance, by means of a clutch collar 23 capable of being shifted along said power shaft, as, for instance, by means of a clutch lever 24. The countershaft 20 carries a worm 25 meshing with and driving a gear 26 carried by a stud 27 mounted in the chassis frame 10. A pinion 28 connected to or forming a part of the gear wheel 26 meshes with and drives a gear 29 on the stud 14, thereby imparting rotation to a large bevel gear 30 carried by said stud. A shaft 31 is journaled in the turntable, and upon said shaft is mounted a pinion 32 arranged to mesh with the teeth of bevel gear 30. Also mounted on the opposite end of shaft 31 is a gear 33 which meshes with and drives pinions 34, 35, suitably connected to drums 36, 37, respectively, so as to drive said drums in opposite directions, said pinions 34, 35, being disposed at respectively opposite sides of the gear 33. A cable 38 has its respective ends connected to said drums 36, 37, so as to wind thereon when said drums are rotated. Said cable is arranged to pass over suitable guide rolls mounted in the vertical guide frame 15. For instance, the end of the cable which is connected to drum 37 passes upwardly from said drum over guide pulley 40 mounted in the base of the vertical guide member 15, thence upwardly around a guide pulley 41 at the upper portion of said guide member, thence downwardly around a guide pulley 42 near the base of the vertically extending guide member, thence upwardly around a pulley 43 at the top of the guide member 15, thence downwardly around a pulley 44 fastened to the slide 17, thence upwardly over a pulley 45 at the top of the vertical guide member 15, thence downwardly around a guide pulley 46 near the base of the vertical member 15, thence upwardly around a guide pulley 47 near the top of the guide member 15, thence downwardly around the guide pulley 48 at the base of the guide member 15, and thence to and around the drum 36, and is anchored to said drum. With this arrangement it will be readily seen that when rotation is imparted to shaft 31 in one direction the drums 36, 37, are rotated in opposite directions to wind up or to pay out the cable end portions. It will also be observed that the leads of the cable end portions from the lowermost guide pulleys 40 and 48 to and around the drums are in such relation that when the drum 37 is rotated in reverse direction to the travel of the hands of a clock, for instance, as seen in Fig. 6, the cable end attached thereto will be wound upon the drum while at the same time the drum 36 will be rotated likewise in a direction opposite to that of the travel of the hands of a clock to also wind the cable end portion which is attached thereto upon said drum. The result is that the intermediate bights of the cable will tend to shorten but since the guide pulleys 40, 42, 46, 48, located at the base of the vertical portion 15 remain a fixed distance apart from their cooperating pulleys 41, 43, 45, 47, at the upper end of the guide member 15, the only bight of the cable which is shortened is that which passes around the pulley 44 on the slide member 17, and the shortening of this bight of the cable will cause the slide 17 to be elevated in its guideway 18 in the guide member 15, thereby tilting the floor member or support 16, the latter rocking or swinging about its pivot hinge or axis indicated at 49, see Figs. 3 and 7. The vertically disposed guide member 15, as above explained, is hinged or pivoted as at 50 upon the turntable 13 so as to rock or swing to accommodate the vertically tilting movement of the platform 16 as the latter is raised or lowered. If desired suitable detachable latch devices may be employed to hold or lock the tilting platform 16 upon the turntable 13 to prevent tilting movement thereof as when the truck is used in the ordinary manner. Such a latch device is indicated at 51 in Figs. 3 and 7. In like manner the turntable 13 may be detachably latched against swinging movement upon the chassis 10, and a latch device 52 is shown in Fig. 7 for this purpose.

It may sometimes be desirable to limit the swinging movement of the turntable 13 upon the chassis frame 10 and to adjustably control the extent of such swinging movement. Such adjustment may be accomplished in any suitable or convenient manner. A simple arrangement is shown for this purpose wherein a stop lug 53 is adjustably mounted in a guide 54 formed in or carried by a guide member of the chassis frame 10, said guide extending in the direction of the length of the chassis frame, said lug being clamped in any desired position of adjustment along said guide by a suitable screw 55. The lug 53 projects above the upper edge of the chassis frame, and in position for the guide member of the turntable to abut thereagainst after the desired extent of the swinging movement of the turntable has been attained.

It may occur that when the turntable 13 is turned to a position approximately at right angles to the chassis frame and when the floor member 16 is tilted vertically to effect a dumping of the load, and particularly where the truck is heavily loaded, a tendency is developed to tilt the entire truck over laterally in the direction of the inclination of the tilting floor member 16, that is, a tilting stress is imposed upon the entire truck tending to overturn it sidewise. I propose, in accordance with my invention, to provide means for preventing this, and have shown one simple illustrative arrangement for accomplishing the desired purpose wherein the turntable 13 is provided with longitudinally extending guide slots 56 in the guide members of the turntable near the rear end thereof, and supporting legs 57 are mounted upon the turntable and are provided with projections or extensions 58 which slide along the slots 56. The slots 56 are enlarged at their rearmost ends as indicated at 59 so that when the supporting legs 57 are drawn out or extended the projections 58 thereon are permitted to swivel or turn in the enlarged portions 59 so as to permit the extended legs to tilt downwardly into vertical position, as shown in dotted lines in Fig. 7, to engage the ground or pavement, and hence form a support for the structure to prevent the same from tipping over.

While the propelling motor for the truck may be employed to drive the power shaft 19, and the gearing required for effecting the swinging movements of the turntable and the tilting movements of the floor member 16, it is obvious that my invention is not to be restricted or limited in this respect, said gearing may be power driven from any suitable or convenient source, and my invention in its broadest aspects is not concerned with the source of power from which the gearing referred to is driven.

It is believed that the operation of the apparatus will be fully and clearly understood from the foregoing description. Assuming that the turntable 13 and the tilting platform or flooring 16 are in their normal and retracted positions, as indicated for example in full lines in Fig. 1, and a load or a loaded body is imposed upon the flooring 16, the truck is then driven in the ordinary way to the point where the load is to be delivered and unloaded. If the unloading station or platform is a sidewalk, for example, the truck is driven to a position parallel with the curb of the sidewalk. The stop device 53 is then adjusted to a point such as to form a stop for the turning movements of the turntable 13 at the desired angle of inclination or turning movement thereof. The countershaft 20 is then geared to the source of power and rotation imparted thereto. Through the worm gearing 25, 26, rotations are imparted to the bevel gear 30. If the latch devices 51, 52, are detached, the first effect of the rotation of bevel gear 30 is to impart a swinging movement to the turntable coincidently with the rotation of the bevel gear. This swinging movement continues until the frame of the turntable abuts against a stop device or is otherwise arrested, as, for instance, the stop lug 53. When this point is reached, and the further swinging movement of the turntable is arrested, the continued rotation of the bevel gear will impart rotation to the gear wheel 32 which meshes therewith, thereby rotating shaft 31, and hence operating the drums 36, 37, causing the cable to wind up on said drums, and hence elevating the front end of the tilting platform or flooring 16 so as to dump or discharge the load. When the unloading has been completed the gearing is reversed, and thereupon the first action is to cause the tilting flooring member 16 to be lowered back into initial position upon the turntable, and when this movement is completed the turntable will be automatically swung around again to the desired extent to attain a position where it may again be latched or fastened to the chassis frame.

It will be understood of course that the swinging movements of the turntable may likewise be utilized for conveniently loading a truck or truck body from a point at the side of the truck frame.

It will be seen from Fig. 4 that the gear 30 is journaled to rotate upon the stud 14, which is mounted in the chassis frame. Gear 30 is frictionally clamped between the plates or members 50, 51, respectively secured to the chassis frame and the turntable, so that when the said gear is rotated the turntable is frictionally driven therewith. During this movement of course the gear 32, and its shaft 31, are carried with the turntable, and hence are not axially rotated. When, however, the rotative movement of the turntable is arrested, the continued rotation of the gear 30 overcomes the friction of the clamping plate or member 51, and hence the gear 32 and shaft 31 will thereupon be axially rotated, thereby causing the slide 17 to move along its guide in the guide member 15, and hence causing the platform 16 to be tilted about its hinge connection to the turntable.

Many variations and changes in the details of construction and arrangement will readily occur to persons skilled in the art and still fall within the spirit and scope of my invention, but having now set forth the object and nature of my invention and a construction embodying the principles thereof, what I claim as new and useful, and of my own invention and desire to secure by Letters Patent is,—

1. In a dumping truck structure, the combination with a chassis frame and its supporting wheels, of a turntable mounted thereon, a vertically tilting platform hinged to said turntable, means to rotatively move said turntable horizontally upon the chassis frame, a stop adjustably mounted on the chassis frame to arrest the rotative movement of said turntable in any desired angular position, and means effective when the rotative movement of the table is arrested to vertically tilt said platform.

2. In a dumping truck structure, the combination with a chassis frame and its supporting wheels, of a turntable mounted thereon for horizontal rotative movement, a vertically tiltable platform hinged to said table, a stop to arrest the rotative movement of said table, means to rotatively move said table, said rotating means also operating, when the rotative movement of the table is arrested, to tilt said platform.

3. In a dumping truck structure, the combination with a chassis frame and its supporting wheels, of a turntable mounted thereon for horizontal rotative movement, a vertically tiltable platform hinged to said table, a stop adjustably mounted on the chassis frame to arrest the rotative movement of the table in any desired angular relation, means to rotate said table, said means effective when the rotative movement of the table is arrested, for tilting said platform.

4. In a dumping truck structure, the combination with a chassis frame and its supporting wheels, of a turntable mounted thereon, a gear wheel mounted on said frame and frictionally engaging said table to rotatively move the same, a platform hinged upon said table to tilt vertically, means to drive said gear, a stop to arrest the rotative movement of said table, said gear operating, when the rotative movement of said table is arrested, to cause said platform to be vertically tilted.

5. In a dumping truck structure, the combination with a chassis frame and its supporting wheels, of a turntable mounted thereon to turn in a horizontal plane, a platform hinged upon said table to tilt vertically, a vertically disposed guide member also hinged to said table, a slide mounted to move vertically in said guide member, means to rotate said turntable, and means to move said slide.

6. In a dumping truck structure, the combination with a chassis frame and its supporting wheels, of a turntable mounted thereon to turn in a horizontal plane, a platform hinged upon said table to tilt vertically, a vertically disposed guide member also hinged to said table, a slide mounted to move vertically in said guide member, means to rotate said turntable, said means also operating to move said slide.

7. In a dumping truck structure, the combination with a chassis frame and its supporting wheels, of a turntable mounted thereon to turn in a horizontal plane, a platform hinged upon said table to tilt vertically, a vertically disposed guide member also hinged to said table, a slide mounted to move vertically in said guide member, a stop to arrest the rotative movement of said turntable, means to rotate said table, and means effective when the rotative movement of said table is arrested, to move said slide.

8. In a dumping truck structure, the combination with a chassis frame and its supporting wheels, of a turntable mounted thereon to turn in a horizontal plane, a platform hinged upon said table to tilt vertically, a vertically disposed guide member also hinged to said table, a slide mounted to move vertically in said guide member, a stop to arrest the rotative movement of said turntable, means to rotate said table, said means also operating, when said table is arrested, to move said slide.

9. In a dumping truck structure, the combination with a chassis frame and its supporting wheels, of a turntable mounted thereon to turn in a horizontal plane, a platform hinged upon said table to tilt vertically, a vertically disposed guide member also hinged to said table, a slide mounted to move vertically in said guide member, a stop device to arrest the rotative movement of said table in any desired position of angularity, a gear to rotate said table, and means actuated by said gear and connected to said slide to move the latter when the turning movement of the turntable is arrested.

10. In a dumping truck structure, the combination with a chassis frame and its supporting wheels, of a turntable mounted on said frame for horizontal rotative movement, a platform hinged to said table for vertical tilting movement, a vertically disposed guide member also mounted on said table, a slide mounted to move in said guide member, and connected to said platform, cable devices connected to said slide to move the same, gearing to turn said table, and means actuated by said gearing to operate said cable devices.

11. In a dumping truck structure, the combination with a chassis frame and its supporting wheels, of a turntable mounted on said frame for horizontal rotative movement, a platform hinged to said table for vertical tilting movement, a vertically disposed guide member also mounted on said table, a slide mounted to move in said guide member, and connected to said platform, cable devices connected to said slide to move the same, a gear connected to said table to rotatively move the same, a shaft mounted in said table and connected to said gear, and means driven by said shaft to actuate said cable devices.

12. In a dumping truck structure, the combination with a chassis frame and its supporting wheels, of a turntable mounted on said frame for horizontal rotative movement, a platform hinged to said table for vertical tilting movement, a vertically disposed guide member also mounted on said table, a slide mounted to move in said guide member, and connected to said platform, cable devices connected to said slide to move the same, a stop to arrest the rotative movement of said table, a gear frictionally engaging said table, and means actuated by said gear for operating said cable devices.

13. In a dumping truck structure, the combination with a chassis frame and its supporting wheels, of a turntable mounted on said frame for horizontal rotative movement, a platform hinged to said table for vertical tilting movement, a vertically disposed guide member also mounted on said table, a slide mounted to move in said guide member, and connected to said platform, cable devices connected to said slide to move the same, a stop to arrest the rotative movement of said table, a gear frictionally engaging said table, a shaft journaled in said table and geared to said gear, and means actuated by said shaft for operating said cable devices.

In testimony whereof I have hereunto set my hand on this first day of June A. D., 1921.

YOKICHI KINOSHITA.